United States Patent
Li

(10) Patent No.: US 10,564,750 B2
(45) Date of Patent: Feb. 18, 2020

(54) CONDUCTIVE FILM STRUCTURE FOR TOUCH SENSOR

(71) Applicant: Wuhan China Star Optoelectronics Semiconductor Display Technology Co., Ltd., Wuhan, Hubei (CN)

(72) Inventor: Bo Li, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 245 days.

(21) Appl. No.: 15/740,720

(22) PCT Filed: Dec. 5, 2017

(86) PCT No.: PCT/CN2017/114600
§ 371 (c)(1),
(2) Date: Dec. 28, 2017

(87) PCT Pub. No.: WO2019/095454
PCT Pub. Date: May 23, 2019

(65) Prior Publication Data
US 2019/0384434 A1 Dec. 19, 2019

(30) Foreign Application Priority Data
Nov. 20, 2017 (CN) .......................... 2017 1 1155667

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC ..... G06F 3/0412; G06F 3/0421; G06F 3/0445
See application file for complete search history.

(56) References Cited

U.S. PATENT DOCUMENTS

2015/0177962 A1* 6/2015 Seong ................. G06F 3/04845
715/781
2017/0038874 A1* 2/2017 Lin ........................ G06F 3/0412
(Continued)

FOREIGN PATENT DOCUMENTS

| CN | 103389827 A | 11/2013 |
| CN | 104345936 A | 2/2015 |

*Primary Examiner* — Gerald Johnson
(74) *Attorney, Agent, or Firm* — Hemisphere Law, PLLC; Zhigang Ma

(57) ABSTRACT

The present application discloses a conductive film structure for a touch sensor. The conductive film structure includes a substrate, grooves disposed on the substrate for filling touch-sensing layers, wherein each of the groove has an opening of the groove and a bottom of the groove; the touch-sensing layers filled in the grooves; and light absorbing isolation layers disposed on sides of the touch-sensing layers facing the opening of the groove and/or on sides of the touch-sensing layers facing the bottom of the groove. The application also discloses a touch sensor. The touch sensor and the conductive film structure of the present application can improve the optical effect of the touch sensor, prevent the touch-sensing layers from oxidation, and improve the reliability of the touch sensor.

13 Claims, 1 Drawing Sheet

(56) References Cited

U.S. PATENT DOCUMENTS

| | | | | |
|---|---|---|---|---|
| 2017/0315641 A1* | 11/2017 | Cai | ................. | G06F 3/0412 |
| 2018/0006272 A1* | 1/2018 | Lee | ................. | H01L 27/3272 |
| 2018/0011568 A1* | 1/2018 | Cai | ................. | G06F 3/044 |
| 2019/0129525 A1* | 5/2019 | Jeong | ................. | G06F 3/0446 |
| 2019/0220151 A1* | 7/2019 | Mitsui | ................. | H01L 51/50 |

* cited by examiner

CONDUCTIVE FILM STRUCTURE FOR TOUCH SENSOR

RELATED APPLICATIONS

The present application is a National Phase of International Application Number PCT/CN2017/114600, filed Dec. 5, 2017, and claims the priority of China Application No. 201711155667.9, filed Nov. 20, 2017.

FIELD OF THE DISCLOSURE

The disclosure relates to a conductive film structure for touch sensor field, and more particularly to a touch sensor and its conductive film structure.

BACKGROUND

In the conventional technology, with the rapid rise of the AMOLED flexible display technology, the entire components in the upstream and downstream are accelerated development in the field of flexible technologies.

From the perspective of touch screen technology, the touch scheme of the glass substrate such as the single-glass touch panel and the cover plate touch panel cannot meet the requirement of the flexible display touch technology. Because the nano-silver technology is not yet mature yet, it cannot be a lot of popularity in the field of touch. Although indium tin oxide material (ITO) can be used in the fixed curve surface of the display panel, however, in the applications of the smaller radius of curvature and dynamic folding, due to the material of ITO itself, it is easy to crack, and cannot meet the needs of dynamic folding. For metal grid touch technology, by the using of the ductile metal material, it has certain technical advantages in flexibility and foldability comparing to ITO material.

The existing metal grid touch sensor has the following technical problems: 1, the optical problems such as optical reflections, optical interference and etc. easily caused by the metal wire. 2, the migration of saver particles after long-term use to bring the risk of dysfunction to limit the further popularization of this technology.

SUMMARY

The technical problem to be solved by the present application is to provide a touch sensor and its conductive film structure thereof, to improve the optical effect of the touch sensor, prevent the oxidation of the touch-sensing layer, and improve the reliability of the touch sensor.

In order to solve the above technical problem; the embodiments of the present application provide a conductive film structure for a touch sensor, including: a substrate; grooves disposed on the substrate for filling touch-sensing layers, wherein each of the groove has an opening of the groove and a bottom of the groove; the touch-sensing layers filled in the grooves; and light absorbing isolation layers disposed on sides of the touch-sensing layers facing the opening of the groove and/or on sides of the touch-sensing layers facing the bottom of the groove.

Wherein the substrate is a transparent plastic substrate, the grooves are arranged in a grid, and the touch-sensing layers are metal material.

Wherein the light absorbing isolation layer and the touch-sensing layers are integrated filling into the grooves by nanoimprint.

In order to solve the above technical problem; the embodiments of the present application provide a conductive film structure for a touch sensor, including: a substrate; grooves disposed on the substrate for filling touch-sensing layers, wherein each of the groove has an opening of the groove and a bottom of the groove; the touch-sensing layers filled in the grooves; light absorbing isolation layers disposed on sides of the touch-sensing layers facing the bottom of the groove; and isolation layers disposed on sides of the touch-sensing layers facing the openings of the grooves.

Wherein, further including a polarizer formed on a side of the substrate provided with the grooves.

Wherein the substrate is a transparent plastic substrate, the grooves are arranged in a grid, and the touch-sensing layers are metal material.

Wherein the light absorbing isolation layer and the touch-sensing layers are integrated filling into the grooves by nanoimprint.

In order to solve the above technical problem; the embodiments of the present application provide a touch sensor; wherein the touch sensor includes a conductive film structure for the touch sensor, the conductive film structure for the touch sensor including: a substrate; grooves disposed on the substrate for filling touch-sensing layers, wherein each of the groove has an opening of the groove and a bottom of the groove; the touch-sensing layers filled in the grooves; and light absorbing isolation layers disposed on sides of the touch-sensing layers facing the opening of the groove and/or on sides of the touch-sensing layers facing the bottom of the groove.

Wherein the substrate is a transparent plastic substrate; the grooves are arranged in a grid, and the touch-sensing layers are metal material.

Wherein the light absorbing isolation layer and the touch-sensing layers are integrated filling into the grooves by nanoimprint.

The implementation of the touch sensor and the conductive film structure provided by the present application has the following beneficial effects. The conductive film for the touch sensor includes a substrate, grooves disposed on the substrate for filling touch-sensing layers, each of the grooves has an opening of the groove and a bottom of the groove; the touch-sensing layers filled in the grooves, light absorbing isolation layers disposed on sides of the touch-sensing layer facing the opening of the groove and/or on sides of the touch-sensing layer facing the bottom of the groove to effectively prevent the touch-sensing layers from reflecting on the display panel and external light; the light absorbing isolation layers also have the isolation effect, to prevent the metal lines from contacting the water vapor in the air, and avoids the oxidation of the metal line, and the nanoimprinted groove prevents the possibility migration of the silver particles, improve the reliability of the product.

BRIEF DESCRIPTION OF THE DRAWINGS

In order to describe the technical solutions in the embodiments of the present application or in the conventional technology more clearly, the following briefly introduces the accompanying drawings required for describing the embodiments or the conventional technology. Apparently, the accompanying drawings in the following description merely show merely some embodiments of the present application. For those skilled in the art, other drawings may be obtained based on these drawings without any creative work.

DETAILED DESCRIPTION OF PREFERRED EMBODIMENTS

The technical solutions in the embodiments of the present application will be described clearly and completely hereinafter with reference to the accompanying drawings in the embodiments of the present application. Apparently, the described embodiments are merely some but not all of the embodiments of the present application. All other embodiments obtained by persons of ordinary skill in the art based on the embodiments of the present application without creative efforts shall fall within the protection scope of the present application.

Figure 1:
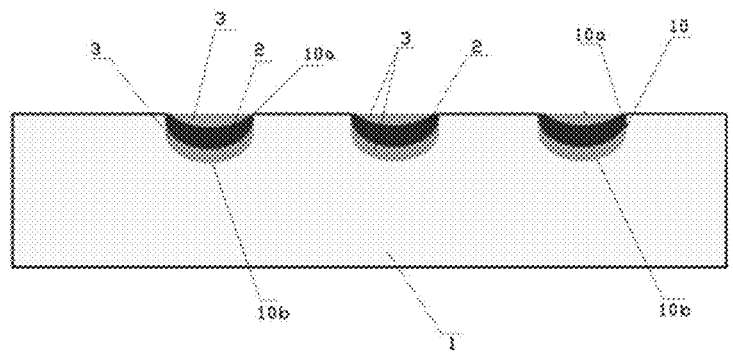
FIG. 1 is a schematic structural diagram of a conductive film for a touch sensor according to a first embodiment of the present application.

Referring to FIG. 1, a first embodiment of a conductive film structure for a touch sensor according to the present application is shown.

The conductive film structure for a touch sensor in this embodiment includes a substrate 1, grooves 10 disposed on the substrate for filling touch-sensing layers 2, each of the grooves 10 has an opening of the groove 10a and a bottom of the groove 10b; the touch-sensing layers 2 filled in the grooves 10, light absorbing isolation layers 3 disposed on sides of the touch-sensing layers 2 facing the opening of the groove 10a and/or on sides of the touch-sensing layers 2 facing the bottom of the groove 10b.

In a specific implementation, the grooves 10 can be pressed onto the plastic substrate 1 by nanoimprint technology. The substrate 1 is a transparent plastic substrate, the grooves 10 are arranged in a grid, and the touch-sensing layers 2 are made of metal material, for example, the touch-sensing layers 2 are a metal grid made of copper, silver or the like formed on the transparent plastic substrate such as PET.

The light absorbing isolation layers 3 in this embodiment may be formed on the sides of the touch-sensing layer 2 facing the opening of the groove 10a, or on the sides of the touch-sensing layer 2 facing the bottom of the groove 10b, or the light absorbing isolation layers 3 are respectively formed on the two sides of the touch-sensing layer 2 facing the opening of the groove 10a and facing the bottom of the groove 10b.

The function of making the light absorbing isolation layers 3 on the metal grid of the touch-sensing layers 2 is to prevent the metal grid of the touch-sensing layers 2 from reflecting the display module and/or external light, so as to weaken the visibility of the metal grid of the touch-sensing layers 2. The light absorbing isolation layers 3 also have a certain isolation effect at the same time, to prevent the metal grid of the touch-sensing layers 2 from contacting the water vapor in the air, and avoiding the oxidation of the metal lines.

Preferably, the light absorbing isolation layers 3 and the touch-sensing layers 2 are integrated filling into the grooves by the way of nanoimprint. In this way, it is possible to prevent possible migration of silver particles in the grooves 10 of the two-layer structure nanoimprinted at the same time, improving the reliability of the product.

For the conductive film structure for the touch sensor in this embodiment; since the sides of the touch-sensing layer 2 facing the opening of the groove 10a and/or the sides of the touch-sensing layer 2 facing the bottom of the groove 10b are provided with the light absorbing isolation layers 3, both to improve the optical effect of the product, but also to prevent oxidation of metal lines, to improve reliability of the touch panel.

Figure 2:
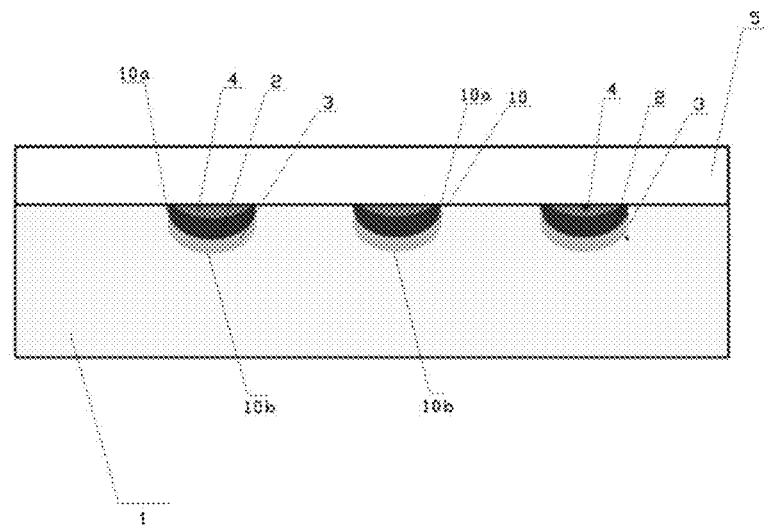
FIG. 2 is a schematic structural diagram of a conductive film for a touch sensor according to a second embodiment of the present application.

Referring to FIG. 2, a second embodiment of the conductive film structure for the touch sensor according to the present application is shown.

The conductive film structure for the touch sensor in this embodiment includes a substrate 1, grooves 10 disposed on the substrate for filling touch-sensing layers 2, each of the grooves 10 has an opening of the groove 10a and a bottom of the groove 10b; the touch-sensing layers 2 filled in the grooves 10, light absorbing isolation layers 3 disposed on sides of the touch-sensing layers 2 facing the bottom of the groove 10b, isolation layers disposed on sides of the touch-sensing layers 2 facing the opening of the groove 10a.

In this embodiment, a polarizer 5 is further formed on a side of the substrate 1 provided with the grooves 10.

In a specific implementation, the grooves 10 can be pressed onto the plastic substrate 1 by nanoimprint technology. The substrate 1 is a transparent plastic substrate, the grooves 10 are arranged in a grid, and the touch-sensing layers 2 are made of metal material, for example, the touch-sensing layers 2 are a metal grid made of copper, silver or the like formed on the transparent plastic substrate such as PET.

The light absorbing isolation layers 3 may be formed on the sides of the touch-sensing layer 2 facing the bottom of the groove 10b, the isolation layers are formed on the sides of the touch-sensing layer 2 facing the opening of the groove 10a. Wherein, the polarizer 5 can block the emitting of the reflected light. In this embodiment, the light absorbing isolation layers on the sides close to the polarizer 5 is changed to the isolation layers 4 having an isolation effect, to serve as a protection effect of the metal grid of the touch-sensing layers 2.

Preferably, the light absorbing isolation layers 3, the isolation layers 4 and the touch-sensing layers 2 are integrally filled in the groove by nanoimprinting. In this way, it is possible to prevent possible migration of silver particles in the grooves 10 by the three-layer structure nanoimprinted at the same time, improving the reliability of the product.

In the conductive film structure for a touch sensor in this embodiment, since the light absorbing isolation layers 3 can be formed on the side of the touch-sensing layers 2 facing the bottom of the groove 10b. The isolation layers 4 are formed on the side of the touch-sensing layers 2 facing the opening of the groove 10a, can not only protect the metal grid of the touch-sensing layers 2, but also improve the optical effect of the product, and improve the reliability of the touch panel.

The present application also discloses a touch sensor including the above conductive film structure for the touch sensor. The implementation of the touch sensor is the same as that of the conductive film structure for the touch sensor and will not be repeated here.

To implement the touch sensor and the conductive film structure provided by the present application has the following beneficial effects: the conductive film for the touch sensor includes: a substrate, grooves disposed on the substrate for filling touch-sensing layers, each of the grooves has an opening of the groove and a bottom of the groove; the touch-sensing layers filled in the grooves, light absorbing isolation layers disposed on sides of the touch-sensing layer facing the opening of the groove and/or on sides of the touch-sensing layer facing the bottom of the groove to effectively prevent the touch-sensing layers from reflecting on the display panel and external light; the light absorbing isolation layers also have the isolation effect, to prevent the metal lines from contacting the water vapor in the air, and avoids the oxidation of the metal line, and the nanoimprinted groove prevents the possibility migration of the silver particles, improve the reliability of the product.

What is claimed is:

1. A conductive film structure for a touch sensor, comprising:
   a substrate;
   grooves disposed on the substrate for filling touch-sensing layers, wherein each of the groove has an opening of the groove and a bottom of the groove;
   the touch-sensing layers filled in the grooves; and
   light absorbing isolation layers disposed on sides of the touch-sensing layers facing the opening of the groove and/or on sides of the touch-sensing layers facing the bottom of the groove.

2. The conductive film structure for the touch sensor according to claim 1, wherein the substrate is a transparent plastic substrate, the grooves are arranged in a grid, and the touch-sensing layers are metal material.

3. The conductive film structure for the touch sensor according to claim 1, wherein the light absorbing isolation layer and the touch-sensing layers are integrated filling into the grooves by nanoimprint.

4. The conductive film structure for the touch sensor according to claim 2, wherein the light absorbing isolation layer and the touch-sensing layers are integrated filling into the grooves by nanoimprint.

5. A conductive film structure for a touch sensor, comprising:
   a substrate;
   grooves disposed on the substrate for filling touch-sensing layers, wherein each of the groove has an opening of the groove and a bottom of the groove;
   the touch-sensing layers filled in the grooves;
   light absorbing isolation layers disposed on sides of the touch-sensing layers facing the bottom of the groove; and
   isolation layers disposed on sides of the touch-sensing layers facing the openings of the grooves.

6. The conductive film structure for the touch sensor according to claim 5, further comprising a polarizer formed on a side of the substrate provided with the grooves.

7. The conductive film structure for the touch sensor according to claim 5, wherein the substrate is a transparent plastic substrate, the grooves are arranged in a grid, and the touch-sensing layers are metal material.

8. The conductive film structure for the touch sensor according to claim 6, wherein the substrate is a transparent plastic substrate, the grooves are arranged in a grid, and the touch-sensing layers are metal material.

9. The conductive film structure for the touch sensor according to claim 5, wherein the light absorbing isolation layer and the touch-sensing layers are integrated filling into the grooves by nanoimprint.

10. The conductive film structure for the touch sensor according to claim 6, wherein the light absorbing isolation layer and the touch-sensing layers are integrated filling into the grooves by nanoimprint.

11. A touch sensor, wherein the touch sensor comprises a conductive film structure for the touch sensor, the conductive film structure for the touch sensor comprising:
   a substrate;
   grooves disposed on the substrate for filling touch-sensing layers, wherein each of the groove has an opening of the groove and a bottom of the groove;
   the touch-sensing layers filled in the grooves; and
   light absorbing isolation layers disposed on sides of the touch-sensing layers facing the opening of the groove and/or on sides of the touch-sensing layers facing the bottom of the groove.

12. The touch sensor according to claim 11, wherein the substrate is a transparent plastic substrate, the grooves are arranged in a grid, and the touch-sensing layers are metal material.

13. The conductive film structure for the touch sensor according to claim 11, wherein the light absorbing isolation layer and the touch-sensing layers are integrated filling into the grooves by nanoimprint.

* * * * *